(12) United States Patent
Lin et al.

(10) Patent No.: US 11,520,448 B2
(45) Date of Patent: Dec. 6, 2022

(54) THREE-DIMENSIONAL SENSING DEVICE AND METHOD OF MANUFACTURING THE SAME

(71) Applicant: TPK Advanced Solutions Inc., Fujian (CN)

(72) Inventors: Feng-Ming Lin, Tainan (TW); Yu-Ting Chan, Taoyuan (TW); Lien-Hsin Lee, Taipei (TW); Tai-Shih Cheng, Taipei (TW); Ren-Hung Wang, Taichung (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/191,107

(22) Filed: Mar. 3, 2021

(65) Prior Publication Data

US 2022/0283670 A1 Sep. 8, 2022

(51) Int. Cl.
*G06F 3/041* (2006.01)
*G06F 3/044* (2006.01)

(52) U.S. Cl.
CPC .......... *G06F 3/0445* (2019.05); *G06F 3/0446* (2019.05); *G06F 2203/04103* (2013.01); *G06F 2203/04105* (2013.01)

(58) Field of Classification Search
CPC ................. G06F 3/0445; G06F 3/0446; G06F 2203/04103; G06F 2203/04105
See application file for complete search history.

(56) References Cited

U.S. PATENT DOCUMENTS

| | | | | |
|---|---|---|---|---|
| 2011/0209749 A1* | 9/2011 | Yang | ............... | H01L 31/022425 136/255 |
| 2012/0175235 A1* | 7/2012 | Jiang | ..................... | G06F 3/0445 200/600 |
| 2013/0043068 A1* | 2/2013 | Xie | ........................ | G06F 3/0446 174/262 |
| 2015/0286319 A1* | 10/2015 | Li | ............................. | G06F 1/16 345/174 |
| 2016/0103526 A1* | 4/2016 | Sohn | ..................... | G06F 3/0446 345/174 |

(Continued)

FOREIGN PATENT DOCUMENTS

| | | |
|---|---|---|
| CN | 105320328 A | 2/2016 |
| CN | 108227978 A | 6/2018 |
| TW | 202046272 A | 12/2020 |

*Primary Examiner* — Md Saiful A Siddiqui
(74) *Attorney, Agent, or Firm* — Cooper Legal Group, LLC

(57) ABSTRACT

A three-dimensional sensing device includes a pressure sensing film, a silver nanowire electrode, a first touch sensing electrode layer, and a second touch sensing electrode layer. The pressure sensing film includes a substrate and a polarized pressure sensing layer. The polarized pressure sensing layer is disposed on and in contact with a first side of the substrate. The silver nanowire electrode is disposed on a side of the polarized pressure sensing layer opposite to the substrate. The first touch sensing electrode layer is disposed on and in contact with a second side of the substrate and includes a patterned electrode with burr etching. The patterned electrode includes first-axis electrodes. A gap between adjacent two first-axis electrodes is between 20 μm to 35 μm. The second touch sensing electrode layer is disposed on a side of the first touch sensing electrode layer opposite to the polarized pressure sensing layer.

14 Claims, 4 Drawing Sheets

(56) References Cited

U.S. PATENT DOCUMENTS

| | | | |
|---|---|---|---|
| 2016/0153846 A1* | 6/2016 | Inoue | G01L 1/2287 |
| | | | 73/862.632 |
| 2016/0246415 A1* | 8/2016 | Bae | G06F 3/0445 |
| 2017/0262096 A1* | 9/2017 | Kim | G06F 3/0416 |
| 2018/0032169 A1* | 2/2018 | Kwak | G06F 3/0446 |
| 2019/0171324 A1* | 6/2019 | Wang | H01L 33/56 |
| 2020/0004358 A1* | 1/2020 | Ye | G06F 3/0448 |
| 2020/0073505 A1* | 3/2020 | Lu | A61B 5/02 |
| 2020/0243802 A1* | 7/2020 | Ju | G06F 3/0446 |
| 2020/0335713 A1 | 10/2020 | Song et al. | |
| 2020/0356202 A1* | 11/2020 | Fang | G06F 3/044 |
| 2020/0363904 A1* | 11/2020 | He | G06F 3/0412 |
| 2021/0064164 A1* | 3/2021 | Inou | B32B 27/281 |
| 2021/0208735 A1* | 7/2021 | Xie | G06F 3/0446 |

* cited by examiner

THREE-DIMENSIONAL SENSING DEVICE AND METHOD OF MANUFACTURING THE SAME

BACKGROUND

Technical Field

The present disclosure relates to a three-dimensional sensing device and a method of manufacturing the same.

Description of Related Art

As the demand for touch pressure sensing applications has greatly increased, related integrated applications have emerged accordingly. In response to mobile needs, products equipped with applications with touch sensing, pressure sensing, and display functions have attracted attention.

At present, some existing technologies adopt a manufacturing method in which a pressure sensing module and a touch sensing module are manufactured simultaneously. A piezoelectric material of the pressure sensing module needs to be polarized in advance, and the touch sensing module or other module components often need to be manufactured by a high temperature process (for example, higher than 100° C.), as mentioned in the CN108227978A, which uses a high-temperature heat treatment process. However, this high-temperature process may degrade or result in a loss of the piezoelectric properties of the polarized piezoelectric material.

Accordingly, how to provide a three-dimensional sensing device and a method of manufacturing the same to solve the aforementioned problems becomes an important issue to be solved by those in the industry.

SUMMARY

An aspect of the disclosure is to provide a three-dimensional sensing device and a method of manufacturing the same that can efficiently solve the aforementioned problems.

According to an embodiment of the disclosure, a three-dimensional sensing device includes a pressure sensing film, a silver nanowire electrode, a first touch sensing electrode layer, and a second touch sensing electrode layer. The pressure sensing film includes a substrate and a polarized pressure sensing layer. The polarized pressure sensing layer is disposed on and in contact with a first side of the substrate. The silver nanowire electrode is disposed on a side of the polarized pressure sensing layer opposite to the substrate. The first touch sensing electrode layer is disposed on and in contact with a second side of the substrate and includes a patterned electrode with burr etching. The patterned electrode includes a plurality of first-axis electrodes. A gap between adjacent two of the first-axis electrodes is between 20 μm to 35 μm. The second touch sensing electrode layer is disposed on a side of the first touch sensing electrode layer opposite to the polarized pressure sensing layer.

In an embodiment of the disclosure, the first touch sensing electrode layer is a silver nanowire electrode layer.

In an embodiment of the disclosure, the three-dimensional sensing device further includes an adhesive. The adhesive is adhered between the first touch sensing electrode layer and the second touch sensing electrode layer.

In an embodiment of the disclosure, the first touch sensing electrode layer includes an effective electrode area and an ineffective electrode area. The effective electrode area and the ineffective electrode area are separated from each other. The first-axis electrodes are located in the effective electrode area.

In an embodiment of the disclosure, an edge of each of the first-axis electrodes comprises a plurality of arc-shaped contours.

In an embodiment of the disclosure, the second touch sensing electrode layer is a silver nanowire electrode layer or an indium tin oxide electrode layer.

In an embodiment of the disclosure, the polarized pressure sensing layer is a polarized polyvinylidene difluoride layer.

According to an embodiment of the disclosure, a method of manufacturing a three-dimensional sensing device includes: providing a pressure sensing film, the pressure sensing film including a substrate and a pressure sensing layer, the pressure sensing layer being disposed on and in contact with a first side of the substrate; forming a conductive layer on a second side of the substrate; patterning the conductive layer by using a laser patterning process, such that the conductive layer becomes a first touch sensing electrode layer having a patterned electrode with burr etching; and forming a second touch sensing electrode layer on a side of the first touch sensing electrode layer opposite to the pressure sensing layer.

In an embodiment of the disclosure, the patterned electrode includes a plurality of first-axis electrodes. A gap between adjacent two of the first-axis electrodes is between 20 μm to 35 μm.

In an embodiment of the disclosure, the laser patterning process uses infrared laser.

In an embodiment of the disclosure, the method further includes: coating a silver nanowire electrode on a side of the pressure sensing layer opposite to the substrate.

In an embodiment of the disclosure, the forming the second touch sensing electrode layer includes: adhering the first touch sensing electrode layer and the second touch sensing electrode layer by an adhesive.

In an embodiment of the disclosure, the forming the second touch sensing electrode layer includes: patterning another conductive layer, such that the another conductive layer becomes the second touch sensing electrode layer.

In an embodiment of the disclosure, the patterning the another conductive layer includes: patterning the another conductive layer by using the laser patterning process, such that the another conductive layer becomes the second touch sensing electrode layer having another patterned electrode with burr etching.

In an embodiment of the disclosure, the pressure sensing layer is a polarized polyvinylidene difluoride layer.

In an embodiment of the disclosure, the laser patterning process is a low temperature laser etching process.

In an embodiment of the disclosure, a process temperature of the laser patterning process is less than 100 degrees Celsius.

Accordingly, in the method of manufacturing a three-dimensional sensing device of the present disclosure, the first touch sensing electrode layer formed on the pressure sensing film uses a low-temperature laser patterning process to obtain the patterned electrode with burr etching, so the piezoelectric properties of the polarized piezoelectric material in the pressure sensing film will not be degraded or lost due to temperature. In addition, since the second touch sensing electrode layer is adhered to the first touch sensing electrode layer after the patterned electrode is manufactured, a high-temperature process (for example, a photolithography process) or a low-temperature patterning process can be flexibly adopted for the formation of the patterned electrode on the second touch sensing electrode layer, thereby increasing process flexibility.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
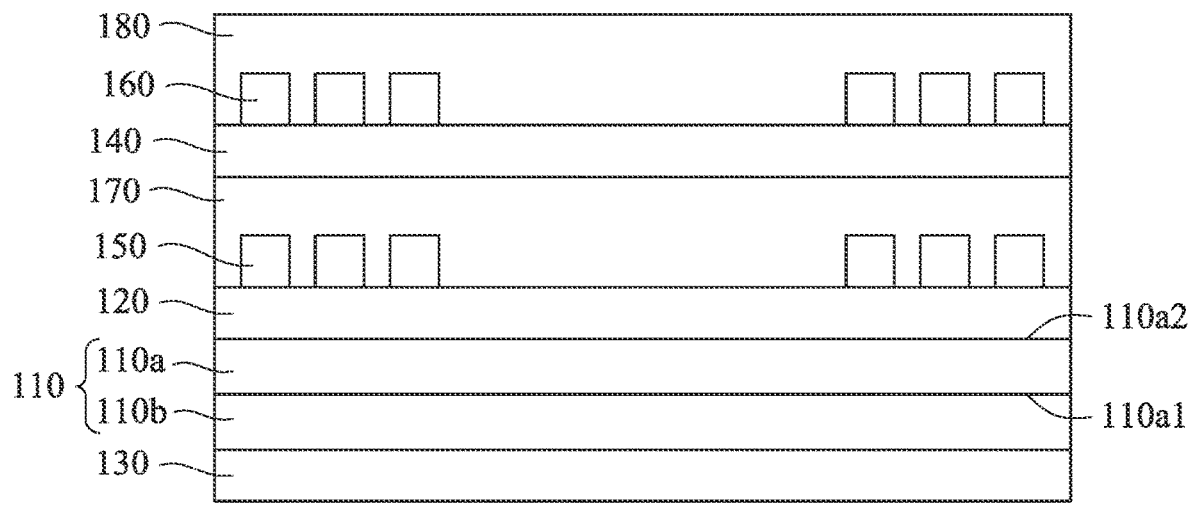
FIG. 1 is a schematic diagram showing a three-dimensional sensing device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram showing a three-dimensional sensing device 100 according to an embodiment of the present disclosure. As shown in FIG. 1, the three-dimensional sensing device 100 includes a pressure sensing film 110, a first touch sensing electrode layer 120, a silver nanowire electrode 130, a second touch sensing electrode layer 140, traces 150 and 160, and an adhesive 170. The pressure sensing film 110 includes a substrate 110a and a polarized pressure sensing layer 110b. The polarized pressure sensing layer 110b is disposed on and in contact with a first side 110a1 of the substrate 110a. The silver nanowire electrode 130 is disposed on a side of the polarized pressure sensing layer 110b opposite to the substrate 110a. The first touch sensing electrode layer 120 is disposed on and in contact with a second side 110a2 of the substrate 110a. The trace 150 is disposed on and electrically connected to the first touch sensing electrode layer 120. The second touch sensing electrode layer 140 is disposed on a side of the first touch sensing electrode layer 120 opposite to the polarized pressure sensing layer 110b. The trace 160 is disposed on and electrically connected to the second touch sensing electrode layer 140. The adhesive 170 is adhered between the first touch sensing electrode layer 120 and the second touch sensing electrode layer 140 and includes a dielectric material, so that the first touch sensing electrode layer 120 and the second touch sensing electrode layer 140 can be electrically insulated. In this way, touch signals (such as mutual capacitance sensing signals) between the first touch sensing electrode layer 120 and the second touch sensing electrode layer 140 can be extracted through the traces 150 and 160.

In some embodiments, as shown in FIG. 1, the three-dimensional sensing device 100 may further include a covering layer 180. The covering layer 180 covers a side of the second touch sensing electrode layer 140 away from the first touch sensing electrode layer 120.

Figure 2:
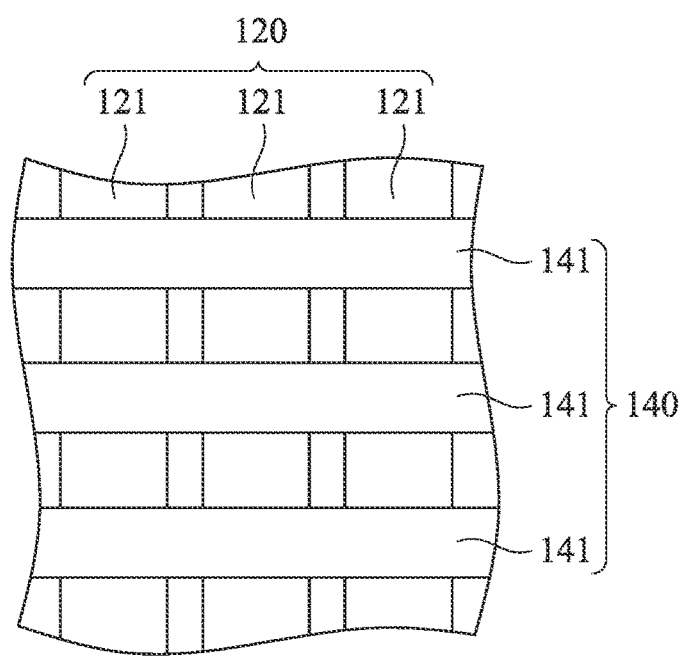
FIG. 2 is a top view of a first touch sensing electrode layer and a second touch sensing electrode layer shown in FIG. 1.

Reference is made to FIG. 2. FIG. 2 is a top view of the first touch sensing electrode layer 120 and the second touch sensing electrode layer 140 shown in FIG. 1. As shown in FIG. 2, the first touch sensing electrode layer 120 includes a plurality of first-axis electrodes 121 that are separated from each other. The second touch sensing electrode layer 140 includes a plurality of second-axis electrodes 141 that are separated from each other and across the first-axis electrodes 121. The aforementioned "first-axis" and "second-axis" are, for example, two mutually perpendicular axes (for example, X axis and Y axis), respectively. In other words, the first-axis electrodes 121 are conductive lines extending along a first axis and arranged at intervals. The second-axis electrodes 141 are conductive lines extending along a second axis and arranged at intervals.

In some embodiments, the first-axis electrodes 121 of the first touch sensing electrode layer 120 are patterned electrodes obtained by using a laser patterning process. In the process of manufacturing the first touch sensing electrode layer 120, a conductive layer can be first coated on the second side 110a2 of the substrate 110a, and then the conductive layer can be patterned by using a laser patterning process, such that the conductive layer becomes the first touch sensing electrode layer 120 having the patterned electrodes with burr etching. In this way, the piezoelectric properties of the polarized piezoelectric material in the pressure sensing film 110 will not be degraded or lost due to the process temperature when manufacturing the first touch sensing electrode layer 120.

In some embodiments, the laser patterning process is a low temperature laser etching process, but the disclosure is not limited in this regard. In some embodiments, a process temperature of the laser patterning process is less than 100 degrees Celsius.

Figure 3:
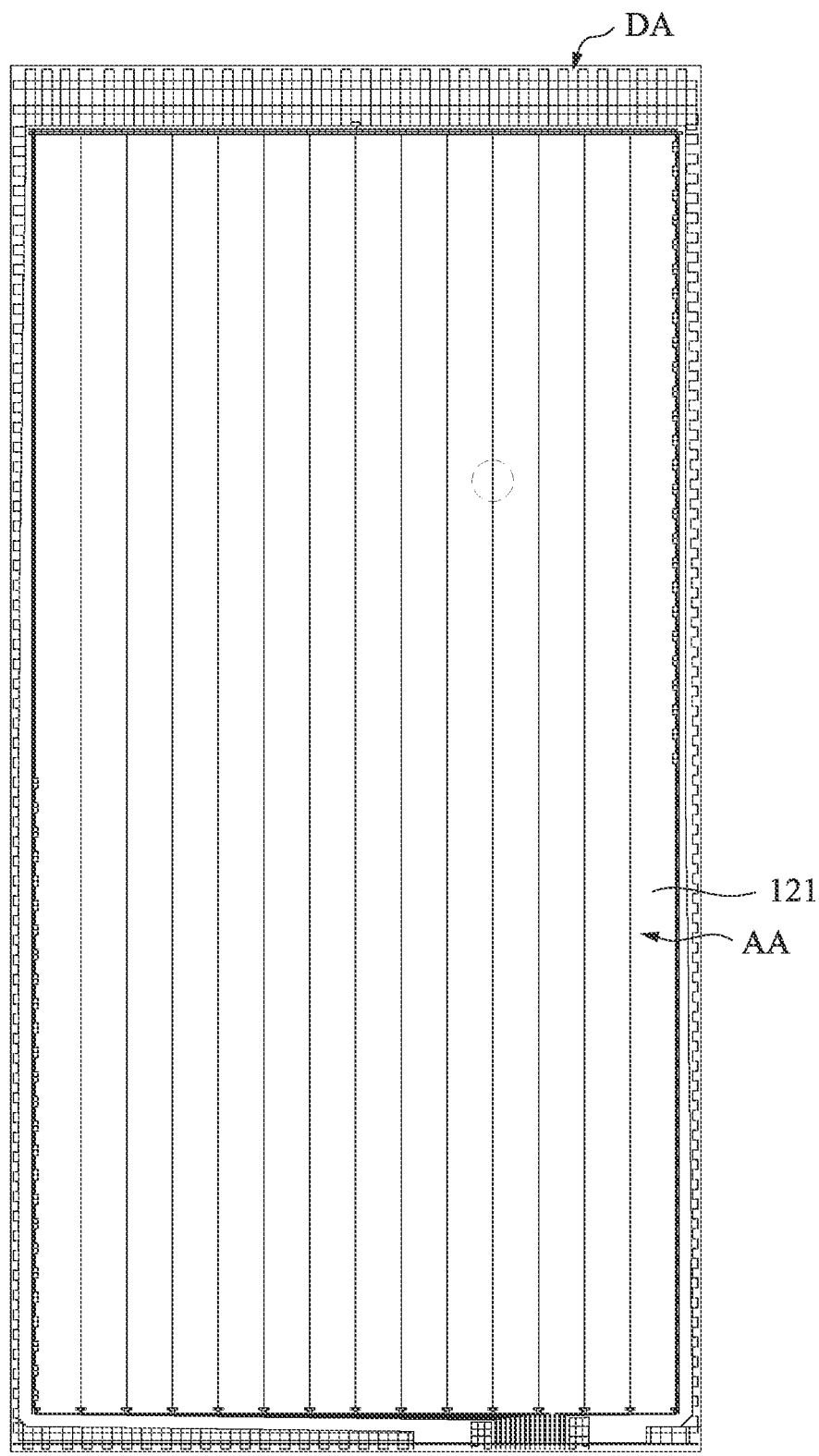
FIG. 3 is a schematic diagram showing patterns formed on the first touch sensing electrode layer by a laser patterning process.

Reference is made to FIGS. 2 and 3. FIG. 3 is a schematic diagram showing patterns formed on the first touch sensing electrode layer 120 by a laser patterning process. In the embodiment where the patterned electrodes of the first touch sensing electrode layer 120 (i.e., the first-axis electrodes 121) are manufactured by the low-temperature laser etching process, a low-temperature laser can be used to pattern the conductive layer coated on the second side 110a2 of the substrate 110a according to the pattern shown in FIG. 3 (which can also be regarded as the travel path of the low-temperature laser), so as to obtain the first-axis electrodes 121.

Specifically, the first touch sensing electrode layer 120 includes an effective electrode area AA and an ineffective electrode area DA. The effective electrode area AA and the ineffective electrode area DA are separated from each other. The first-axis electrodes 121 are located in the effective electrode area AA. It should be noted that the ineffective area of a conventional touch sensing electrode layer can be washed away directly (for example, through a photolithography process). However, for the first touch sensing electrode layer 120 manufactured by using the laser patterning process in the present disclosure, laser scanning can only be used to break electrical connections in the ineffective electrode area DA to form a dummy pattern area. Please note that the ineffective electrode area DA is not completely removed to form the electrically separated dummy pattern area, which brings about the beneficial effect of effectively avoiding electrostatic damage (i.e., effectively resisting electrostatic discharge (ESD)).

Figure 4:
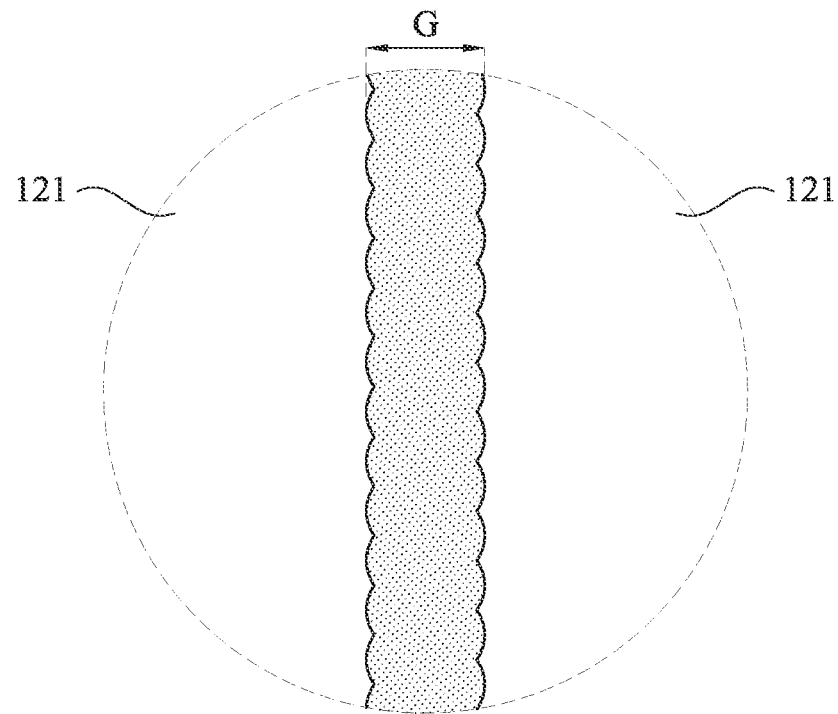
FIG. 4 is a partial enlarged view of the first touch sensing electrode layer shown in FIG. 3.

Reference is made to FIG. 4. FIG. 4 is a partial enlarged view of the first touch sensing electrode layer 120 shown in FIG. 3. As shown in FIG. 4, an edge of each of the first-axis electrodes 121 comprises a plurality of arc-shaped contours. For example, the laser beam used in the laser patterning process is used to etch the first touch sensing electrode layer 120 in a spiral travel manner, so that the edge of each of the first-axis electrodes 121 includes a plurality of arc-shaped contours connected in sequence. The aforementioned "burr etching" refers to these arc-shaped contours.

In some embodiments, a gap G between adjacent two of the first-axis electrodes 121 is between 20 μm to 35 μm. The aforementioned range is equal to or slightly greater than the diameter of the laser beam used in the laser patterning process. The laser sintering energy can make the gap G slightly greater than the diameter of the laser beam.

In some embodiments, the polarized pressure sensing layer 110*b* is a polarized polyvinylidene difluoride (PVDF) layer. That is, the material of the polarized pressure sensing layer 110*b* includes polyvinylidene difluoride. In other words, the polarized pressure sensing layer 110*b* is a lattice piezoelectric material. When pressure is applied to a certain direction of the crystal of this material to produce deformation, the magnitude and direction of the dipole also changes accordingly, so the amount of charge also changes, thereby generating a voltage.

In some embodiments, the first touch sensing electrode layer 120 is a silver nanowire (SNW; also known as AgNW) electrode layer. In detail, the first touch sensing electrode layer 120 includes a substrate and silver nanowires doped therein. The silver nanowires overlap each other in the substrate to form a conductive network. The substrate refers to a non-nanosilver material formed by a solution including the silver nanowires through processes such as coating, heating, and drying. The silver nanowires are distributed or embedded in the substrate and partially protrude out from the substrate. The substrate can protect the silver nanowires from the external environment such as from corrosion and abrasion. In some embodiments, the substrate is compressible.

In some embodiments, a wire length of the silver nanowires ranges from about 10 μm to about 300 μm. In some embodiments, a wire diameter (or a wire width) of the silver nanowires is less than about 500 nm. In some embodiments, an aspect ratio of the silver nanowires (the ratio of the wire length to the wire diameter) is greater than 10. In some embodiments, the silver nanowires can be deformed forms such as other conductive metal nanowires or non-conductive nanowires coated with silver. The use of the silver nanowires to form the silver nanowire electrode layer has the following advantages compared with indium tin oxide (ITO): low price, simple process, good flexibility, resistance to bending, etc.

In some embodiments, the second touch sensing electrode layer 140 is a silver nanowire electrode layer identical or similar to the first touch sensing electrode layer 120. The second-axis electrodes 141 of the second touch sensing electrode layer 140 are patterned electrodes obtained by using a laser patterning process. In the process of manufacturing the second touch sensing electrode layer 140, another conductive layer can be patterned by using the laser patterning process, such that the another conductive layer becomes the second touch sensing electrode layer 140 having the patterned electrodes with burr etching (i.e., the second-axis electrodes 141). In practical applications, a low-temperature laser may be used to pattern the another conductive layer according to another pattern (not shown) similar to the pattern shown in FIG. 3 to obtain the second-axis electrodes 141.

In some embodiments, the second touch sensing electrode layer 140 is an ITO electrode layer. In the process of manufacturing the second touch sensing electrode layer 140, a photolithography process can be used to pattern the another conductive layer made of ITO, so that the another conductive layer becomes the second touch sensing electrode layer 140 with the plurality of second-axis electrodes 141. Since the second touch sensing electrode layer 140 is made separately from the first touch sensing electrode layer 120 and then bonded to the first touch sensing electrode layer 120, even if the second touch sensing electrode layer 140 is an ITO electrode layer and is bonded to the first touch sensing electrode layer 120 after a high-temperature process, the piezoelectric properties of the polarized piezoelectric material in the pressure sensing film 110 will not be affected.

Figure 5:
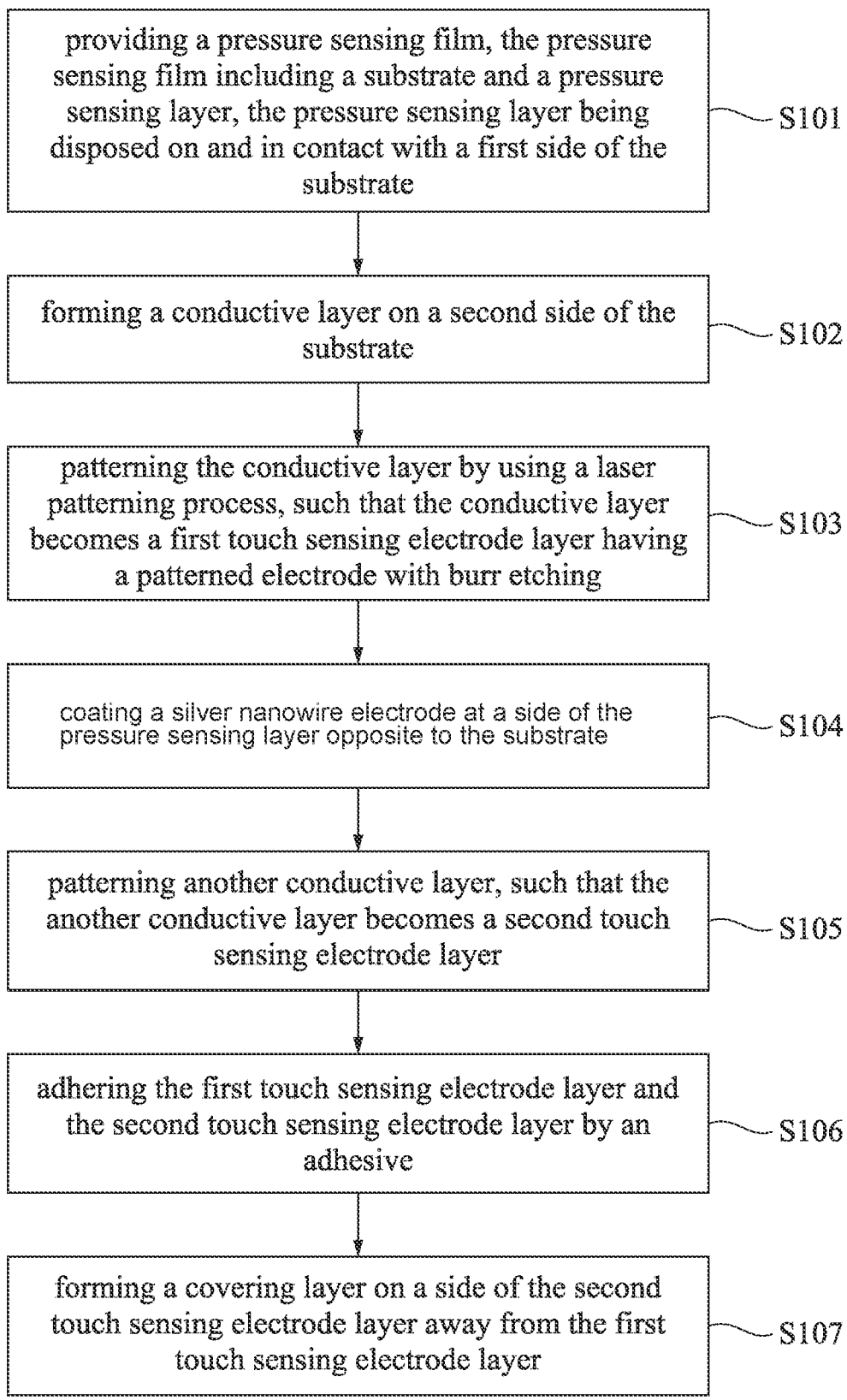
FIG. 5 is a flowchart of a method of manufacturing a three-dimensional sensing device.

Reference is made to FIG. 5. FIG. 5 is a flowchart of a method of manufacturing a three-dimensional sensing device. As shown in FIG. 5, the method includes step S101 to step S106.

Step S101: providing a pressure sensing film, the pressure sensing film including a substrate and a pressure sensing layer, the pressure sensing layer being disposed on and in contact with a first side of the substrate.

Step S102: forming a conductive layer on a second side of the substrate.

Step S103: patterning the conductive layer by using a laser patterning process, such that the conductive layer becomes a first touch sensing electrode layer having a patterned electrode with burr etching.

Step S104: coating a silver nanowire electrode at a side of the pressure sensing layer opposite to the substrate.

Step S105: patterning another conductive layer, such that the another conductive layer becomes a second touch sensing electrode layer.

Step S106: adhering the first touch sensing electrode layer and the second touch sensing electrode layer by an adhesive.

In some embodiments, the aforementioned laser patterning process uses infrared laser, but the disclosure is not limited in this regard.

In some embodiments, step S102 and step S103 may be performed earlier than step S105. In some embodiments, step S102 and step S103 may be performed later than step S105.

In some embodiments, step S105 can also use the laser patterning process used in step S103 to pattern the another conductive layer, such that the another conductive layer becomes the second touch sensing electrode layer with the another patterned electrode with burr etching.

In some embodiments, the method may further include step S107.

Step S107: forming a covering layer on a side of the second touch sensing electrode layer away from the first touch sensing electrode layer.

In some embodiments, a process temperature of the aforementioned laser patterning process is less than 100 degrees Celsius.

According to the foregoing recitations of the embodiments of the disclosure, it can be seen that in the method of manufacturing a three-dimensional sensing device of the present disclosure, the first touch sensing electrode layer formed on the pressure sensing film uses a low-temperature laser patterning process to obtain the patterned electrode with burr etching, so the piezoelectric properties of the polarized piezoelectric material in the pressure sensing film will not be degraded or lost due to temperature. In addition, since the second touch sensing electrode layer is adhered to the first touch sensing electrode layer after the patterned electrode is manufactured, a high-temperature process (for example, a photolithography process) or a low-temperature patterning process can be flexibly adopted for the formation of the patterned electrode on the second touch sensing electrode layer, thereby increasing process flexibility.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A three-dimensional sensing device, comprising:
    a pressure sensing film comprising:
        a substrate; and
        a polarized pressure sensing layer disposed on and in contact with a first side of the substrate;
    a silver nanowire electrode disposed on a side of the polarized pressure sensing layer opposite to the substrate, wherein the silver nanowire electrode is in direct contact with the polarized pressure sensing layer;
    a first touch sensing electrode layer disposed on and in contact with a second side of the substrate and patterned by a laser patterning process, the first touch sensing electrode layer having a plurality of first-axis electrodes divided by a plurality of gaps, a sidewall of each of the first-axis electrodes faces a corresponding one of the gaps and is defined by a plurality of arcs, wherein the first touch sensing electrode layer is a silver nanowire electrode layer;
    a second touch sensing electrode layer disposed on a side of the first touch sensing electrode layer opposite to the polarized pressure sensing layer; and
    an adhesive adhered between the first touch sensing electrode layer and the second touch sensing electrode layer.

2. The three-dimensional sensing device of claim 1, wherein the first touch sensing electrode layer comprises an effective electrode area and an ineffective electrode area, the effective electrode area and the ineffective electrode area are separated from each other, and the first-axis electrodes are located in the effective electrode area.

3. The three-dimensional sensing device of claim 1, wherein the second touch sensing electrode layer is a second silver nanowire electrode layer or an indium tin oxide electrode layer.

4. The three-dimensional sensing device of claim 1, wherein the polarized pressure sensing layer is a polarized polyvinylidene difluoride layer.

5. The three-dimensional sensing device of claim 1, wherein the first touch sensing electrode layer and the second touch sensing electrode layer comprise different materials.

6. The three-dimensional sensing device of claim 1, wherein the second touch sensing electrode layer comprises indium tin oxide.

7. The three-dimensional sensing device of claim 1, wherein the first touch sensing electrode layer comprises an effective electrode area and an ineffective electrode area, wherein electrical connections in the ineffective electrode area are broken to define a dummy pattern area.

8. The three-dimensional sensing device of claim 1, wherein silver nanowires of the silver nanowire electrode layer have an aspect ratio greater than 10.

9. A method of manufacturing a three-dimensional sensing device, comprising steps in sequence of:
    providing a pressure sensing film, the pressure sensing film comprising a substrate and a pressure sensing layer, the pressure sensing layer being disposed on and in contact with a first side of the substrate;
    coating a silver nanowire electrode directly on a side of the pressure sensing layer opposite to the substrate;
    forming a conductive layer directly on a second side of the substrate;
    patterning the conductive layer by using a laser patterning process, such that the conductive layer becomes a first touch sensing electrode layer having a plurality of first-axis electrodes divided by a plurality of gaps, wherein:
        a process temperature of the laser patterning process is less than 100 degrees Celsius,
        the first touch sensing electrode layer is a silver nanowire electrode layer, and
        a sidewall of each of the first-axis electrodes faces a corresponding one of the gaps and is defined by a plurality of arcs;
    providing a second touch sensing electrode layer; and
    adhering the second touch sensing electrode layer to the first touch sensing electrode layer by an adhesive.

10. The method of claim 9, wherein the laser patterning process uses infrared laser.

11. The method of claim 9, wherein the providing the second touch sensing electrode layer comprises:
    patterning another conductive layer, such that the another conductive layer becomes the second touch sensing electrode layer.

12. The method of claim 11, wherein the patterning the another conductive layer comprises:
    patterning the another conductive layer by using the laser patterning process, such that the another conductive layer becomes the second touch sensing electrode layer having a plurality of second-axis electrodes having at least one surface defined by a plurality of arcs.

13. The method of claim 9, wherein the pressure sensing layer is a polarized polyvinylidene difluoride layer.

14. The method of claim 9, wherein the patterning comprises breaking electrical connections to define a dummy pattern area and in an ineffective electrode area of the first touch sensing electrode layer.

* * * * *